United States Patent [19]
Uhl et al.

[11] 3,718,579
[45] Feb. 27, 1973

[54] PROCESS FOR CHARGING CATALYST

[75] Inventors: George A. Uhl, Markham; Lloyd A. Baillie, Homewood, both of Ill.

[73] Assignee: Atlantic Richfield Company, New York, N.Y.

[22] Filed: Sept. 24, 1971

[21] Appl. No.: 183,690

[52] U.S. Cl. .................208/143, 208/146, 208/152, 214/17 C, 214/152, 23/1 E
[51] Int. Cl. ...........................................C10g 23/02
[58] Field of Search......208/143, 146, 152, 167, 136, 208/137, 57; 214/17 C, 152

[56] References Cited

UNITED STATES PATENTS

| | | | |
|---|---|---|---|
| 3,668,115 | 6/1972 | Uhl et al. | 208/143 |
| 2,952,622 | 9/1960 | McClure | 208/167 |
| 2,458,162 | 1/1949 | Hagerbaumer | 208/167 |

*Primary Examiner*—Delbert E. Gantz
*Assistant Examiner*—James W. Hellwege
*Attorney*—Thomas J. Clough et al.

[57] ABSTRACT

An improved process for charging a solid substantially spherical catalyst to a fixed bed reactor by charging the catalyst at a rate of fill of the reactor of up to about 17 inches per minute and in a manner such that the catalyst particles are distributed at substantially the same rate over the entire surface of the catalyst bed.

19 Claims, No Drawings

PROCESS FOR CHARGING CATALYST

This invention relates to a process for charging a solid substantially spherical catalyst to a reactor and, more particularly, to a catalyst charging process which provides for increased catalyst density.

In the past, catalyst has been charged by what is commonly referred to as the "sock" method. In this method, a hopper having an attached hose which extends to the bottom of the reactor or catalyst surface is utilized. The hopper and hose are charged with catalyst and the catalyst is released at the bottom of the hose by raising the hose slowly. The resulting catalyst bed develops a cone which, during the loading of the catalyst, can be distributed over the catalyst bed by raking. Commercial reactors varying in width from about 1 foot to about 15 feet, having lengths of from about 5 feet to 70 feet, are loaded by this "sock" technique. One of the problems that is associated with loading reactors by this method is that the catalyst bed can contain catalyst voids which can, during the use of the catalyst, bring about catalyst settling problems, localized hot spots caused during the exothermic reactions of reactants, and the necessity to utilize increased reactor volume. In addition, the "sock" technique requires increased times for loading a reactor since the hose through which the catalyst enters the reactor has to be continually adjusted upwardly in order to allow catalyst to flow. In addition to the above method, catalyst can be continually added through a hopper which also results in the formation of a cone on the catalyst bed. As in the above method, the catalyst cone can be distributed over the catalyst bed by raking.

Thus, the settling of catalyst can change the overall volume of the catalyst bed thereby producing damage to equipment such as thermowells which have been inserted into the reactor for temperature measurements. In addition, the settling of catalyst can reduce the surface of the catalyst bed to level whereby the thermowell is not in contact with the catalyst, thereby not allowing the reaction temperature to be monitored during the course of a reaction.

An additional problem associated with the prior art method of charging catalyst is that for a given reactor volume the amount of catalyst which can be charged is determined by the final catalyst density. Thus, a means for increasing the bulk density of catalyst present would allow for increased throughput of reactants at the same space velocity or the same throughput at lower space velocities. Thus, more severe reaction conditions and/or increased throughput can be obtained for a given volume of catalyst if the maximum bulk density of the catalyst can be achieved.

It is, therefore, an object of this invention to increase catalyst utilization in fixed bed reactors.

It has now been found that increased catalyst utilization and bulk density is increased by a process for charging a substantially spherical catalyst to a reactor which comprises charging to the reactor in downflow relationship to said reactor, solid catalyst particles having a substantially spherical geometry on an average basis at a rate of fill of the reactor of up to about 17 vertical inches per minute, and at an average free fall distance of the catalyst particles through a gaseous medium to catalyst surface of at least about 1 foot, and distributing the catalyst particles over the entire catalyst bed surface at substantially the same rate of fill.

More particularly, it has been found that a substantial improvement in bulk density approaching the maximum bulk density of the catalyst is obtained by the process of this invention. In addition, the increase in bulk density produces a rigid catalyst bed with a substantially reduced tendency toward settling. Of additional importance is the fact that the process of this invention provides for the preparation of a catalyst bed with minimum formation of catalyst fines. Thus, the formation of catalyst fines is in general below 1 percent based on the total volume of catalyst charged and generally below .50 percent by volume.

In addition to the above, a method is provided for increasing the bulk density of catalyst per unit volume of reactor by charging catalyst according to he process set forth above. A particular advantage for the use of catalyst charged according to he process of this invention is in various hydrocarbon conversion processes such as hydrogenation, reforming, hydrocracking, cracking, hydrodesulfurization and oxidation wherein such hydrocarbon conversion process is carried out in a fixed bed reactor. The method of this invention is particularly advantageous with hydrodesulfurization, hydrocracking, hydrogenation and reforming processes. A particularly preferred application of the method is with reforming and hydrogenation processes. Thus, a method is provided for improved hydroconversion processes wherein a hydrocarbon is subjected to a process as set forth above wherein the improvement comprises charging said catalyst of that process by the method of this invention. The various process conditions of temperature, pressure and space velocity vary according to the process and such conditions include those well known to those skilled in the above processes. In a particularly preferred embodiment, the utilization of this catalyst charging process provides for an improved hydrogenation process wherein a hydrogenation catalyst is charged to a reactor according to the process of this invention, hydrogen and hydrogenateable organic material, for example, a petroleum hydrocarbon, are contacted with said hydrogenation catalyst and a hydrogenated organic material is recovered. Thus, the hydrogenation process of this invention provides for allowing more throughput at the same weight hourly space velocity for a given reactor and for greater catalyst weight per volume of reactor. The increase in catalyst bulk density, therefore, allows for the construction and use of smaller and less expensive reactors for a given throughput.

In carrying out the process of this invention, substantially spherical catalyst is charged to a reactor in downflow relationship to said reactor. In general, reactor sizes varying between about 1 to about 15 feet, preferably from about 3 to about 13 feet in diameter, and from about 5 to about 125 feet, more preferably from about 10 to about 70 feet in length can be charged by the process of this invention. The catalyst is charged to the reactor at a rate of fill of the reactor of up to about 17 vertical inches per minute, more preferably from about 1 to about 6 and still more preferably from about 2 to about 4 inches per minute. The rate of fill of the reactor can be non-uniform, that is, the rate of fill can vary within the above range. It is preferred, however, that the rate of fill be uniform and that after a given rate of fill is established, that this rate of fill be maintained while preparing the catalyst bed. The catalyst particles are introduced into the reactor at a point such that the distance to the catalyst surface formed as the catalyst particles are introduced through a gaseous medium provides an average free fall distance of catalyst particles of at least about 1 foot, more preferably an average free fall distance of from about 5 to about 125 feet and still more preferably from about 10 to about 70 feet. The gaseous medium in general is air, or depending on the catalyst, an inert medium such as nitrogen. Thus, in general, the catalyst particles fall individually to the catalyst surface as the catalyst bed is formed. The catalyst particles are distributed over the surface area of the catalyst bed as it is formed such that the catalyst surface rises at a substantially uniform rate. The catalyst particles are distributed in order to produce a catalyst surface which has a difference between the highest portion of the catalyst surface and the lowest portion of the catalyst surface which is less than 10 percent of the diameter of the catalyst bed, that is a substantially flat surface, more preferably less than 5 percent and still more preferably less than 1 percent.

The above rates of fill, free fall distance and uniform distribution of the catalyst within the above preferred ranges are preferred since they provide for approaching substantially the maximum bulk density achievable for a given catalyst bed. The reactor sizes which are preferred are those reactors which, in general, are utilized in commercial processes such as hydrogenation, reforming and hydrocracking.

The process of this invention is applicable to catalyst particles which have a substantially spherical geometry and is particularly advantageous for spherical hydrogenation catalyst particles. In general, the particle diameter should not be greater than 3% of the reactor diameter and, in general, such to about catalyst particles have a particle diameter of from about 1/64 to about ½ of an inch, more preferably from abut 1/16 to about ¼ of an inch. The catalyst particles are substantially spherical and, in general, have a length over diameter of the particles of from 1 to about 1.5, more preferably from 1 to about 1.1. In the above expression, length is defined as the length of the particle when the length is greater than the average diameter of the particle such as when the catalyst particle is not a true sphere.

The catalyst can be charged to the reactor by a variety of means as long as the process parameters, as set forth above, are met. Thus, the catalyst particles can be added through a multiperforated disc which has the same area as the catalyst bed to be formed and which allows for catalyst particles to be distributed over the entire catalyst surface.

A preferred method for charging the catalyst to a reactor is to utilize a hopper which, in essence, is an inverted cone which has an opening at the vertex of the cone. In order to have uniform distribution of the catalyst particles, a hollow conical diverter (e.g., a cone) is mounted in the hopper outlet. The vertical height of the conical diverter can be adjusted by adjusting means, such as a threaded rod through the center of the diverter and the hopper. The vertex of the conical diverter is centered in the hopper outlet. The vertical position of the conical diverter is adjusted to allow catalyst flow and thus regulates the amount of catalyst flow from 0 to varying rates of fill of the reactor. The conical diverter is a cone which, on the surface of the cone from a point below the hopper outlet to base, comprises a plurality of substantially equally spaced apertures varying in length from about 1 to about 20 inches and in width from about ¼ to about 1 inch. In general, there are from about 4 to about 24 apertures on the surface of the conical diverter. The size of the conical diverter depends upon the size of the reactor which is being charged and, in general, has a length from the vertex to the base of from about 6 to about 18 inches and a diameter of the base of from about 6 to about 18 inches. The dimensions of the conical diverter and apertures are adjusted in order to provide for the flowing of catalyst from the hopper along the surface of the conical diverter to the base of the conical diverter and through the apertures at a rate to provide for uniform distribution of catalyst particles over the surface area of the reactor and catalyst surface which is being formed.

A wide variety of solid substantially spherical catalysts can be charged according to the process of this invention such as oxidation, hydrodesulfurization, hydrocracking, cracking, reforming and hydrogenation catalysts. Typical examples of hydrodesulfurization catalysts comprise any of the transitional metals, metal oxides, metal sulfides, or other metal salts which are known to catalyze hydrodesulfurization, and are not poisoned by hydrogen sulfide or other sulfur compounds. The preferred catalysts comprise the oxides and/or sulfides, as for example the oxides or sulfides of molybdenum, tungsten, iron, cobalt, nickel, chromium and the like. Vanadium compounds may also be employed in some cases. A particularly active combination consists of a group VI-B metal oxide or sulfide with a group VIII metal oxide of sulfide. For example, compositions containing both molybdenum oxide and cobalt oxide, molybdenum oxide and nickel oxide, tungsten sulfide and nickel sulfide, and the like may be employed.

A particularly active catalyst consists of the composite known as cobalt molybdate, which actually may be a mixture of cobalt and molybdenum oxides wherein the atomic ratio of Co to Mo may be between about 0.4 and 5.0. This catalyst, or any of the above catalysts may be employed in unsupported form, or alternatively it may be suspended on a suitable adsorbent oxide carrier such as alumina, silica, zirconia, thoria, magnesia, titania, bauxide, acid-activated clays, or any combination of such materials.

Typical examples of hydrocracking catalyst are crystalline metallic aluminosilicate zeolite, having a platinum group metal (e.g., platinum or palladium) deposited thereon or composited therewith. These crystalline zeolites are characterized by their highly ordered crystalline structure and uniformly dimensioned pores, and have an aluminosilicate anionic cage structure wherein alumina and silica tetrahedra are intimately connected to each other so as to provide a large number of active sites, with the uniform pore openings facilitating entry of certain molecular structures. It has been found that crystalline aluminosilicate zeolites, having effective pore diameter of about 6 to 15, preferably 8 to 15 Angstrom units, when composted with the platinum group metal, and particularly after base exchange to reduce the alkali metal oxide (e.g., $Na_2O$) content of the zeolite to less than about 10 weight percent, are effective hydrocracking catalysts. Other suitable carriers or supports include acidic supports such as: silica-alumina, silica-magnesia, and other well-known cracking catalyst bases; the acidic clays; fluorided alumina; and mixtures of inorganic oxides, such as alumina, silica, zirconia, and titania, having sufficient acidic properties providing high cracking activity, and a mixture of support materials. This, for example, a zeolite and an alumina can be blended together as a support material in varying proportions which support materials contain various metals deposited thereon.

Other catalysts are supported hydrogenation catalysts comprising a Group VIII metal in the Periodic Table, such as nickel, cobalt, iron or one of the platinum group metals such as palladium, platinum, iridium, or ruthenium on a suitable support. Generally, it is preferred that an oxide or sulfide of a Group VIII metal (particularly iron, cobalt or nickel) be present in mixture with an oxide or sulfide of a Group VI-B metal (preferably molybdenum or tungsten). A suitable support is alumina.

Typical examples of cracking catalysts are the well-known commercial varieties, e.g., Davison XZ-25, Aerocat Triple S-4, Nalcat KSF, Houdry HZ-1, etc. These catalysts are made up of a silica-alumina-zeolite base in particle sizes usually within a size range of 1/32 to ⅜ inch, suitably 1/16 to ⅛ inch, and containing rare earth metal oxides.

Typical compositions of the catalysts are the following. Davison XZ-25, a product of Davison Chemical Company, is a mixed silica-alumina-zeolite cracking catalyst containing about 30-35 weight percent alumina, 18 weight percent zeolite X, and about 2 weight percent cerium and 1 weight percent lanthanum. Aerocat Triple S-4, a product of American Cyanamid Company, is a silica-alumina-zeolite cracking catalyst containing about 32 weight percent alumina, 3 weight percent zeolite Y, 0.5 weight percent cerium and 0.1 weight percent lanthanum. Nalcat KSF, a product of Nalco Chemical Co., is a silica-alumina-zeolite cracking catalyst containing about 31-35 weight percent alumina, 11 percent zeolite X, about 1 percent cerium and 0.3 percent lanthanum.

The process of this invention is particularly adaptable to hydrogenation processes and, more particularly, for the hydrogenation processes and, more particularly, for the hydrogenation of, for example, lubricating viscosity petroleum fractions to white mineral oils and solvent dewaxed raffinate mineral oil derived from crude oil having a characterization factor of at least 11.5. In carrying out a preferred hydrogenation process, two stages can be utilized, the first stage using a sulfur-resistant hydrogenation catalyst in the presence of hydrogen followed by a second stage treatment of this product with a platinum group metal-alumina catalyst in the presence of hydrogen. It is contemplated that each stage can be used singly as a hydrogenation process and such single stages are also included within the term hydrogenation processes.

The hydrorefining treatment in the first stage is generally conducted at temperatures of about 600° to 775° F., pressures of about 1500 to 5000 p.s.i.g., weight hourly space velocities (WHSV) of about 0.1 to 0.5, and a hydrogen rate of about 1000 to 5000 s.c.f./b. When it is desired to conduct the hydrorefining treatment to produce a technical grade oil, preferred operating conditions are temperatures of about 600° to 700° F., about 1500 to 3000 p.s.i.g. pressure, a WHSV of about 0.2 to 0.5, and hydrogen flow rate of about 1000 to 3000 s.c.f./b. Preferred conditions for producing a food grade oil, on the other hand, are temperatures of about 650° to 725° F., pressures of about 2200 to 5000 p.s.i.g., a WHSV of about 0.15 to 0.35, and hydrogen rates of about 1500 to 5000 s.c.f./b.

The hydrogenated oil from the first hydrorefining stage is then subjected to less severe hydrogenation conditions, for example, at temperature of about 450 (or of about 650° to 725° F., pressures of about 2200 to 5000 p.s.i.g., WHSV of about 0.15 or even about 0.25) to 0.75, and a hydrogen feed rate of about 500 to 5000 s.c.f./b. To provide the less severe reaction conditions, the average temperature of the second stage hydrogenation is at lease about 50, preferably at least about 75° F., less than the first hydrogenation stage. The preferred range of conditions for technical grade oil production are temperatures of about 525° to 650° F., pressures of about 1000 to 3000 p.s.i.g., WHSV of about 0.25 to 0.5, and hydrogen flow rates of about 500 to 3000 s.c.f./b. When the process is operated to produce a food grade oil, the preferred conditions are temperatures of about 450 (or about 500) to 625° F., pressures of about 2000 to 5000 p.s.i.g., WHSV of about 0.15 (or even about 0.25) to 0.35, and hydrogen flow rates of about 1500 to 5000 s.c.f./b.

The catalyst of the first hydrogenation operation can be of any of the sulfur resistant non-precious metal hydrogenation catalysts, some of which are conventionally employed in the hydrogenation of heavy petroleum oils. Examples of suitable catalytic ingredients are tin, vanadium, members of Group VI-B in the Periodic Table, i.e., chromium, molybdenum and tungsten and metals of the iron group, i.e., iron, cobalt and nickel. These metals are often present in catalytically effective amounts, for instance, about 2 to 30 weight percent, and may be present in the form of oxides, sulfides, or other form. Mixtures of materials can be employed, for example, mixtures or compounds of the iron group metal oxides or sulfides with the oxides or sulfides of Group VI-B constitute very satisfactory catalysts. Examples of such mixtures or compounds are nickel molybdate, tungstate, or chromate (or thiomolybdate, thiotungstate or thiochromate) or mixtures of nickel or cobalt oxides with molybdenum, tungsten or chromium oxides. These catalytic ingredients are generally employed while disposed on a suitable carrier of the solid oxide refractory type, e.g., a predominantly calcined or activated alumina. Commonly employed catalysts have about 1 to 10 percent of an iron group metal and 5 to 25 percent of a Group VI-B metal (calculated as the oxide). Advantageously, the catalyst is cobalt molybdate or nickel molybdate supported on alumina. Such preferred catalysts can be prepared by the method described in U.S. Pat. No. 2,938,002.

As aforementioned, the catalyst of the second hydrogenation operation is a platinum group metal-promoted catalyst. This catalyst is to be distinguished from the catalysts of the first hydrogenation in that it is not normally considered to be sulfur-resistant. The catalyst includes catalytically effective amounts of the platinum group metals of Group VIII, for instance platinum, palladium, rhodium or iridium, which are present in catalytically effective amounts, generally in the range of about 0.01 to 2 weight percent, preferably about 0.1 to 1 weight percent. The platinum group metal may be present in the metallic form or as a sulfide, oxide or other combined form. The metal may interact with other constituents of the catalyst but if during use the platinum group metal is present in metallic form, then it is preferred that it be so finely divided that it is not detectable by X-ray diffraction means, i.e., that it exist as crystallites of less than about 50 A size. Of the platinum group metals, platinum is preferred. If desired, the catalysts of the first and second hydrogenations can be hydrogen purged or prereduced prior to use by heating in the presence of hydrogen, generally at temperatures of about 300° to 600° F. for purging or at about 600° to 800° F. for prereduction.

Although various solid refractory type carriers known in the art may be utilized as a support for the platinum group metal, the preferred support is composed predominantly of alumina of the activated or calcined type. The alumina base is usually the major component of the catalyst, generally constituting at least about 75 weight percent on the basis of the catalyst and preferably at least about 85 to 99.8 percent. The alumina catalyst base can be an activated or gamma-alumina, alumina monohydrate, alumina trihydrate or their mixtures. A catalyst base advantageously used is a mixture predominating in, or containing a major proportion of, for instance about 65 to 95 weight percent of one or more of the alumina trihydrates, a bayerite I, nordstrandite or gibbonite, and about 5 to 35 weight percent of alumina monohydrate (boehmite), amorphous hydrous alumina or their mixtures. The alumina base can contain small amounts of other solid oxides such as silica, magnesia, natural or activated clays (such as kaolinite, montmorillonite, halloysite, etc.), titania, zirconia, etc., or their mixtures.

The invention can be better appreciated by the following non-limiting example.

EXAMPLE

In order to demonstrate the increased bulk density of a catalyst bed formed by the process of this invention, examples were performed wherein a catalyst was added to a simulated reactor (500 ml. volume) using a pour down method (A) and the method of this invention (B). The density of the catalyst bed was determined by weighing the amount of catalyst charged per volume of the simulated reactor. In addition, a catalyst bed produced by the pour down method was vibrated to determine the maximum packing achievable with a spherical bed catalyst by this method (C). In the following table, various examples were performed to illustrate the increase in bulk density achievable through the process of this invention.

TABLE

| Example | Catalyst | | | |
|---|---|---|---|---|
| No. | Type | Method | Density | %Increase |
| I | (1) | A | 0.436 | |
| II | (1) | B | 0.474 | 8.7 |
| III | (1) | C | 0.469 | |
| IV | (2) | A | 0.741 | |
| V | (2) | B | 0.816 | 10.1 |
| VI | (3) | A | 1.008 | |
| VII | (3) | B | 1.106 | 9.75 |

(1) Nalco 474S, ⅛" Beads
(2) Engelhard Spherical Alumina Carrier, 1/16" beads
(3) Malinkrodt Alumina Spheres, ⅛" average diameter The results set forth in Examples I through VII demonstrate the outstanding results from the process of this invention. More particularly, the various examples using the process of this invention show an increase in bulk density over the pour down method. Of additional importance is the fact that the catalyst bed density was greater than a corresponding bed which was formed by the pour down method and further subjected to vibration to form a firm catalyst bed. Thus, the catalyst bed prepared by the process of this invention substantially eliminates catalyst settling problems which can result in damage to internal parts of reactors and in some cases the complete inability to monitor the temperature of reactions. Of particular importance are Examples II, V and VII wherein the bulk density of the catalyst bed is increased by the process of this invention. More particularly, the percent bulk density increase varies from the prior art methods of pour down of from 8.7 to 10.1 percent. This remarkable increase in bulk density provides for greater catalyst efficiency and utilization in carrying out various processes. Thus, higher throughput of reactants can be obtained while minimizing the amount of reactor volume necessary for such throughput. In addition, the method of this invention provides for an increase in the amount of catalyst that can be charged to an existing reactor.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. In a process wherein a solid substantially spherical catalyst is charged to a fixed bed reactor, and a catalyst surface is formed as a volume of catalyst is added to the reactor to form a catalyst bed, the improvement which comprises charging to the reactor in downflow relationship to said reactor, solid catalyst particles having a substantially spherical geometry on an average basis at a rate of fill of the reactor of up to about 17 vertical inches per minute, and at an average free fall distance of the catalyst particles through a gaseous medium to catalyst surface of at least about 1 foot, and distributing the catalyst particles at substantially the same rate of fill over the catalyst bed surface.

2. A process of claim 1 wherein the rate of fill is from 1 to about 6 inches per minute.

3. A process of claim 2 wherein the rate of fill is from about 2 to about 4 inches per minute.

4. A process of claim 1 wherein the free fall distance is from about 5 to about 125 feet.

5. A process of claim 2 wherein the free fall distance is from about 10 to about 70 feet.

6. A process of claim 1 wherein the catalyst particles have a diameter of from about 1/64 of an inch to about ½ of an inch.

7. A process of claim 4 wherein the catalyst particles have a diameter of from about 1/64 of an inch to about ½ of an inch.

8. A method for increasing the bulk density of a catalyst bed per unit volume of a reactor which comprises charging to a reactor in downflow relationship to said reactor, solid catalyst particles having a substantially spherical geometry on an average basis at a rate of fill of the reactor of up to about 17 vertical inches per minute, and at an average free fall distance of the catalyst particles through a gaseous medium to catalyst surface of at least about 1 foot, and distributing the catalyst particles at substantially the same rate of fill over the catalyst bed surface.

9. A process of claim 8 wherein the rate of fill is from 1 to about 6 inches per minute.

10. A process of claim 9 wherein the free fall distance is from about 10 to about 70 feet.

11. In an oxidation, hydrodesulfurization, hydrocracking, cracking, reforming or hydrogenation hydrocarbon conversion process wherein said hydrocarbon material is subjected to processing over a catalyst in a reactor, the improvement which comprises charging to said reactor in downflow relationship to said reactor, solid catalyst particles having a substantially spherical geometry on an average basis at a rate of fill of the rector of up to about 17 vertical inches per minute, and at an average free fall distance of the catalyst particles through a gaseous medium to catalyst surface of at least about 1 foot, and distributing the catalyst particles at substantially the same rate of fill over the catalyst bed surface.

12. A process of claim 11 wherein the process is a hydrodesulfurization, hydrocracking, reforming or hydrogenation process.

13. A process of claim 12 wherein the rate of fill is from about 1 to about 6 inches per minute.

14. A process of claim 13 wherein the free fall distance is from about 10 to about 70 feet.

15. A process of claim 11 wherein the process is a hydrogenation process.

16. A process of claim 15 wherein the rate of fill is from about 1 to about 6 inches per minute.

17. A process of claim 16 wherein the free fall distance is from about 10 to about 70 feet.

18. A process of claim 15 wherein the catalyst is selected from a Group VI–B metal-on-alumina and a Group VIII metal-on-alumina support.

19. A process of claim 18 wherein the hydrogenation process is at least a two-stage process wherein the first stage uses a Group VI–B metal-on-alumina catalyst and the second stage utilizes a Group VIII metal-on-alumina catalyst.

* * * * *

PO-1050
(5/69)

UNITED STATES PATENT OFFICE
CERTIFICATE OF CORRECTION

Patent No. 3,718,579      Dated February 27, 1973

Inventor(s) George A. Uhl and Lloyd A. Baillie

It is certified that error appears in the above-identified patent and that said Letters Patent are hereby corrected as shown below:

On the Title Page; after "[21] Appl.No.: 183,690," insert the following; --- The portion of the term of the patent subsequent to June 6, 1989, has been disclaimed."---

Signed and sealed this 29th day of May 1973.

(SEAL)
Attest:

EDWARD M. FLETCHER, JR.      ROBERT GOTTSCHALK
Attesting Officer                Commissioner of Patents